United States Patent [19]

Hutton et al.

[11] 3,998,782

[45] Dec. 21, 1976

[54] STABILIZER COMPOSITION FOR POLYVINYL CHLORIDE POLYMERS

[75] Inventors: Ronald Eric Hutton, Southport; Brian Rodney Iles, Liverpool; Vincent Oakes, Eccleston, all of England

[73] Assignee: Akzo N.V., Arnhem, Netherlands

[22] Filed: July 31, 1975

[21] Appl. No.: 600,592

[30] Foreign Application Priority Data

Aug. 1, 1974 Netherlands ............... 7410327

[52] U.S. Cl. .................. 260/45.8 R; 252/404; 260/45.7 PH; 260/23 XA; 260/45.95 G; 260/45.95 R; 260/45.95 F; 260/45.95 H

[51] Int. Cl.² .................. C08K 5/52; C08K 5/53

[58] Field of Search .......... 260/45.7 PH, 45.95 H, 260/45.95 G, 45.95 R, 613 D, 591, 590

[56] References Cited

UNITED STATES PATENTS

| | | | |
|---|---|---|---|
| 2,568,894 | 9/1951 | Mackey | 260/45.95 F |
| 2,593,563 | 4/1952 | Huffman | 260/613 D |
| 2,614,126 | 10/1952 | Krueger | 260/613 D |
| 2,847,443 | 8/1958 | Hechenbleikner et al. | 260/45.7 PH |
| 2,848,345 | 8/1958 | Bell et al. | 260/591 |
| 3,115,465 | 12/1963 | Orloff et al. | 260/45.95 B |
| 3,285,868 | 11/1966 | Hecker et al. | 260/45.95 R |

OTHER PUBLICATIONS

SPE Transactions, Jan. 1962, pp. 28 to 31.

*Primary Examiner*—V.P. Hoke
*Attorney, Agent, or Firm*—Stevens, Davis, Miller & Mosher

[57] ABSTRACT

An improved stabilizer for polyvinyl chloride polymers and copolymers against heat has the composition (a) a compound having the general formula:

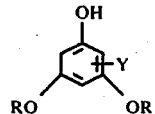

wherein Y is a hydrogen atom or an acyl group, and R is selected from hydrogen, an alkyl group having 1 – 18 carbon atoms or a cycloalkyl group having 1 – 18 carbon atoms or an aralkyl group having 1 – 18 carbon atoms; and (b) an organic phosphite.

8 Claims, No Drawings

STABILIZER COMPOSITION FOR POLYVINYL CHLORIDE POLYMERS

This invention relates to stabilizer compositions for vinyl polymers and copolymers, and in particular, to stabilizer compositions having a low toxicity, capable of improving the resistance of polymers or copolymers of vinyl chloride to deterioration in physical properties on exposure to heat and to stabilized resin compositions of polyvinyl chloride or copolymers thereof including such stabilizer compositions.

Polymers or copolymers of vinyl chloride will undergo rapid degradation when exposed to elevated temperatures during further processing and/or during subsequent use thereof.

Many types of metal-containing additives have been proposed as stabilizers for polyvinyl chloride (PVC)-containing resins in order to protect these resins against discoloration upon exposure to elevated temperatures. Examples of known stabilizers are organo-metallic compounds such as organotin compounds, salts of organic acids with metals such as barium, cadmium, zinc, calcium and magnesium, and basic lead compounds such as tribasic lead sulphate, basic lead carbonate and di-basic lead phosphite.

All these stabilizers have some disadvantages: The organotin compounds, for instance, are expensive and they spread an unpleasant odor, particularly if they contain sulphur.

The more powerful stabilizers of the metallic soap class of compounds are the cadmium compounds; cadmium, however, is relatively expensive, very toxic and cause of discoloration in an atmosphere polluted with sulphur or sulphur compounds.

Non-toxic stabilizers are found in the class of metallic soaps, such as calcium and zinc soaps, but these materials are characterized by poor heat stability and the resins containing them have poor clarity and poor plateout.

The main disadvantages of the various lead stabilizers are their high toxicity coupled with lack of clarity of the resultant PVC resins.

In order to meet the need for stabilizers of low toxicity various attempts have been made to prepare metal-free stabilizers, several of which have for many years been marketed under the general name of "organic stabilizers." Their performance, however, leaves much to be desired, as can be seen for instance from a summary in the S.P.E. Journal, 28th May (1972), which contains a list of the known organic stabilizers. In this summary it is stated that their effect has always been either just as mediocre as that of the calcium-zinc salts or has been limited to certain interactions. This reference goes on to state that the organic compounds are used with metal stabilizers and are regarded a synergistic components and not as main effect stabilizers.

Several other types of organic stabilizers have recently been proposed, for instance, in U.S. Pat. Specification Nos. 3,627,828; 3,574,172; 3,635,881; 3,629,205; 3,630,993 and 3,574,692. However, all the compounds proposed therein are organo-sulphur compounds which have an undesirable odor; further, they have never been found to be of great commercial importance in that the polymers containing these stabilizers discolor during further processing.

This fact is recognized in U.S. Pat. Specification No. 3,630,993, in which it is stated that "The poor heat stability of the materials can only be improved by adding small amounts of organotin compounds." The addition of such compounds increases the cost and does little to improve the remaining objectionable odor because the organotin compounds contain sulphur.

According to the present invention there is provided a low toxicity stabilizer composition, consisting essentially of:

a. a compound having the general formula:

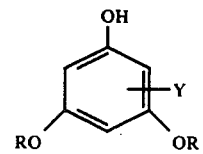

wherein Y is a hydrogen atom or an acyl group, and R is selected from the group consisting of hydrogen and the following organic radicals having from 1 to 18 carbon atoms: an alkyl group, a cycloalkyl group, or an aralkyl group, and (b) an organic phosphite.

It has been found that good results also may be obtained if in the polymers or copolymers of vinyl chloride there is also incorporated a stabilizer capable of reacting with hydrogen chloride and selected from the group of epoxy compounds, metallic soaps or organotin compounds.

Favorable stabilizing properties are obtained if for the acyl group in compound (a) an alkane carbonyl group with 2 to 18 carbon atoms is used. Examples are 2,4,6-trihydroxyacetophenone and 2,4,6-trihydroxypropiophenone.

Alternatively, for the acyl group in compound (a) use may be made of a benzoyl group. For compound (a) it is preferred to make use of phloroglucinol or the mono or dialkyl ethers thereof for these compounds are not only easy to prepare, they also have a relatively low toxicity. Phloroglucinol, for instance, has a minimum lethal dose (determined by subcutaneous injection of rats) of 1.55 g per kg of body weight. Examples of mono-ethers and dialkyl ethers of phloroglucinol are:

1-methoxy-3,5-dihydroxy benzene
1,3-dimethoxy-5-hydroxy benzene
1-lauroxy-3,5-dihydroxy benzene
3,5-dicyclohexoxy phenol
3-methoxy-5-stearoxy phenol For compound (b) it is preferred to use an organic phosphite which is defined by one of the following formulae:

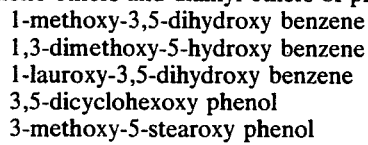

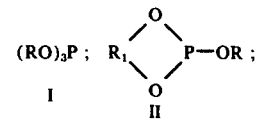

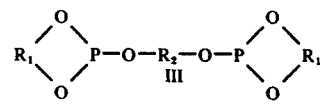

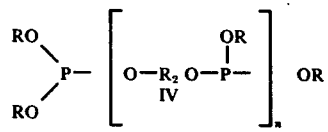

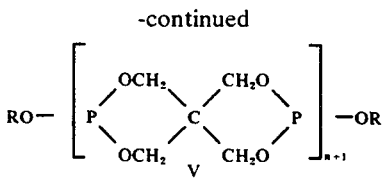

with n = O or a whole number in the range of 1 to 8, and where R may represent an aryl, alkyl, cycloalkyl, aralkyl and/or alkaryl group, and $R_1$ and $R_2$ each represent a bivalent group, namely an arylene, cycloalkylene, aralkylene or alkarylene group.

Examples of the above-mentioned phosphites are described in, for instance, the British Pat. Specifications 1 180 398 and 1 173 763, the disclosures of which are incorporated herein by reference.

Examples of suitable phosphites are:
diphenyl isodecyl phosphite
diphenyl mono-2-ethyl hexyl phosphite
tri-2-ethyl hexyl phosphite
triphenyl phosphite
tri(p-nonyl phenyl) phosphite
tricresyl phosphite
tri(octadecyl) phosphite
di-cyclohexyl-2,4-di-t-butylphenyl phosphite
ethylene phenyl phosphite
tri(α-naphthyl) phosphite
benzyl diphenyl phosphite
tri(2-cyclohexylphenyl) phosphite
tri(2-phenylethyl) phosphite
tri(phenyl phenyl) phosphite
tetradodecyl 4,4'-isopropylidene diphenyl diphosphite
tetrakis(nonylphenyl) dipropylene glycidyl diphosphate
di(nonylphenyl) pentaerythrityl diphosphite
di-n-dodecyl pentaerythrityl diphosphite
di-isodecyl pentaerythrityl diphosphite.

In addition to the compounds (a) and (b) the following compounds (c) may be introduced into polymers or copolymers of vinyl chloride:

A. Epoxy compounds such as:

i. epoxidized soybean oil or linseed oil
ii. epoxidized higher fatty acid esters
iii. epoxidized straight-chain α-olefins
iv. epoxidized polybutadienes, and
v. diglycidyl ether of 4,4'-isopropylidene diphenol B. Metallic soaps such as:

i. calcium benzoate
ii. calcium bis(2-ethyl hexyl maleate)
iii. calcium bis(2-ethyl hexoate)
iv. calcium laurate
v. calcium stearate
vi. calcium acetate
vii. above soaps in which calcium has been replaced by zinc
viii. above soaps in which calcium has been replaced by magnesium
ix. above soaps in which calcium has been replaced by aluminum C. Organotin compounds such as:

i. dioctyltin bis(2-ethyl hexyl maleate)
ii. dioctyltin dilaurate
iii. dioctyltin bis isooctylthioglycollate
iv. mono-octyl tin derivatives of the said compounds
v. butyl tin derivatives of the above compounds Besides, also other known PVC stabilizers such as antioxidants (e.g. the usual phenols) and UV stabilizers may be used in conjunction with the compounds according to the invention.

The weight ratio between the compounds (a) and (b) may vary between wide limits. In the process of the invention it is preferred to choose a weight ratio between the compounds (a) and (b) in the range of 5:1 to 1:10.

The combination of (a) and (b) may be partly replaced by known PVC-stabilizers.

Optimum results are found to be obtained if the weight ratio between the compounds (a) and (b) is about 1:3. Further it is found to be advisable to so choose the relative amounts of said compounds (a) and (b) that for each mole of compound (a) there should be present an amount of the compound (b) and, if desired, if the compound (c) sufficient to react with one mole of hydrogen chloride. The total amount of the stabilizer composition used in the polymer formulations will vary depending on the nature of the polymer to be stabilized, the presence or absence of other additives, and the envisaged end use.

In general, the amount of compounds (a) and (b) will constitute from 0.01 to 10 percent by weight and by preference from 1 to 5 percent by weight of the total polymer composition. With the above information it will not be difficult for a man skilled in the art to compose an optimally effective and cheapest possible stabilizer mixture.

The stabilizer composition of the present invention may be prepared simply by mixing the components thereof. If desired, any further additives may be premixed in the stabilizer composition, which is then mixed with the polymer. Alternatively, the components of the stabilizer mixture and further additives, if desired, may be added separately to the polymer to be stabilized, for instance, during processing.

In a further aspect the prsent invention provides a stabilized polymer and polymer formulation which has a content of a stabilizer composition of the present invention as described above.

In yet a further aspect the present invention provides a method of fabricating a polymer article in which the polymer is stabilized with a stabilizer composition of the present invention as defined above.

The stabilizer compositions of the present invention are particularly suitable for improving the thermal stability of polyvinyl chloride resins of all types, by whatever process they are prepared, for instance, by solution polymerization, emulsion polymerization and suspension polymerization, to name only a few.

The term "polyvinyl chloride" as used herein is inclusive not only of polyvinyl chloride homopolymers of all types, and of post-chlorinated polyvinyl chloride, but also of copolymers of vinyl chloride in a major proportion, and other copolymerizable monomers in a minor proportion, such as copolymers of vinyl chloride and vinyl acetate, copolymers of vinyl chloride and vinylidene chloride, copolymers of vinyl chloride and acrylonitrile, copolymers of vinyl chloride with maleic acid or fumaric acid esters and copolymers of vinyl chloride with styrene, and also mixtures of polyvinyl chloride resins in a major proportion with a minor proportion of other synthetic resins, such as chlorinated polyethy-

EXAMPLE IV

In this example the results are given of a number of comparative tests. They clearly show the improvement in heat stability obtained by using the stabilizer composition of the present invention.

In the runs 1 to 3 a comparison is made between three compounds containing three OH groups, namely between phloroglucinol on the one hand and hydroxy hydroquinone and p-methyl phloroglucinol on the other. In the next five runs a comparison is made between a known recommended PVC stabilizer with two hydroxyl groups (resorcinol) and four compounds according to the invention structurally related thereto: viz. 1-methoxy-3,5-dihydroxy benzene, 1-decanoxy-3,5-dihydroxy benzene, 1-benzyloxy-3,5-dihydroxy benzene and 1,3-dimethoxy-5-hydroxy benzene. In the runs 9 to 12 the known UV stabilizer 2-hydroxy-4-methoxy benzophenone used in PVC is compared with the compounds 2.4.6-trihydroxy propiophenone according to the invention.

In the runs 13 and 14 the compound (a) is replaced by resorcinol or 2,6-di-tert-butyl p-cresol. The latter substance is a well known antioxidant for polyolefins such as polypropylene.

Finally, in the run 15 the entire stabilizer according to the invention is replaced by a liquid barium-, cadmium-, zinc soap stabilizer composition marketed by Interstab Ltd. under the trade name Interstab M 104, which composition is typical of the cadmium containing stabilizers used in flexible polyvinyl chloride formulations.

RESULTS:

| Stabilizer (parts by wt.) | | Compound (b) in all cases is diphenyl iso-decyl phosphite | Time (mins) to specific color | | |
|---|---|---|---|---|---|
| Run | Compound (a) | | pale yellow | amber | black |
| 1 | hydroxyhydroquinone 0.5 | 1.5 | 40 | 60 | 110 |
| 2 | p-methyl-phloroglucinol 0.5 | 1.5 | 50 | 100 | 110 |
| 3 | phloroglucinol 0.5 | 1.5 | 70 | 100 | 110 |
| 4 | resorcinol (=1-methyl-3,5-dihydroxy benzene)0.5 | 1.5 | 50 | 90 | 110 |
| 5 | 1-methoxy-3,5-di-hydroxy benzene 0.5 | 1.5 | 60 | 100 | 110 |
| 6 | 1-decanoxy-3,5-di hydroxy benzene 0.5 | 1.5 | 70 | 100 | 110 |
| 7 | 1-benzyloxy-3,5-di hydroxy benzene 0.5 | 1.5 | 60 | 100 | 110 |
| 8 | 1,3-dimethoxy-5-hydroxy benzene 0.5 | 1.5 | 60 | 100 | 110 |
| 9 | 2-hydroxy-4-methoxy-benzophenone 0.5 | 1.5 | 20 | 50 | 100 |
| 10 | 2,4,6-trihydroxy benzophenone 0.5 | 1.5 | 65 | 90 | 105 |
| 11 | 2,4,6-trihydroxy acetophenone 0.5 | 1.5 | 70 | 100 | 105 |
| 12 | 2,4,6-trihydroxy propiophenone 0.5 | 1.5 | 70 | 100 | 105 |
| 13 | resorcinol 0.5 | 1.5 | 30 | 90 | 100 |
| 14 | 2,6-di-t-butyl p-cresol 0.5 | 1.5 | 20 | 50 | 100 |
| 15 | Interstab M 104 2.0 | — | 60 | 90 | 100 |

From the above table it is obvious that in all cases the stabilizer compositions according to the invention are at least as effective as or even superior to the cadmium-containing soap stabilizers (run no. 15) and are always significantly better than the other organic stabilizers mentioned. In this connection reference is made to a note of Sarvetnick in "Polyvinyl Chloride," Reinhold, New York (1969), page 101, stating that "for white or light colored products stabilizers which prevent even the slightest discoloration are required. Best results are obtained with synergistic Ba-Cd-mixtures, lead, and tin systems. Certain stabilizers may produce a shift in coloration during processing or on aging. Barium-cadmiums and tins are considered to be the most satisfactory."

The compounds mentioned by Sarvetnick are all metal compounds, whose use in judged highly objectionable by the health authorities. The stabilizer compositions of the present invention are entirely metal-free and have a low toxicity. Their resistance to heat is superior to that of the known compositions.

The above Table also shows that of the known metal-free organic stabilizers the one that gives still the best results is p-methyl phloroglucinol. It should be added, however, that the use of this compound gives a pronounced darkening of the P.V.C. in addition to the described color changes.

EXAMPLE V

This example demonstrates the use of phloroglucinol with a variety of different phosphites, in a flexible formulation as in Examples III and IV.

RESULTS:

| Stabilizer (parts by wt.) | | | Time (mins) to specific color | | |
|---|---|---|---|---|---|
| Test | Compound (a) in all cases is phloroglucinol | Compound (b) | | pale yellow | amber | black |
| 1 | 2.0 | Tri phenyl phosphite | — | 20 | 50 | 80 |
|  | 1.5 | " | 0.5 | 30 | 80 | 110 |
|  | 1.0 | " | 1.0 | 40 | 80 | 110 |
|  | 0.5 | " | 1.5 | 30 | 70 | 90 |
|  | — | " | 2.0 | 20 | 60 | 80 | lene, or copolymers of acrylonitrile, butadiene and styrene.

One important advantage of the present invention is the provision in one aspect of an efficient non-metallic organic stabilizer composition i.e. wherein metal additives are absent. Since metallic, especially cadmium and lead, compounds may be totally absent, various other disadvantages such as poor resistance to sulphur staining in industrial atmospheres, poor clarity especially in P.V.C. resins, exudation and plate-out problems may be reduced or even avoided.

The preferred stabilizer component (a) compound-phloroglucinol is relatively non-toxic, having a minimal lethal dose (determined by subcutaneous injection of rats) of 1.55 g per kg of body weight. Further, several stabilizer component (b) compounds, in particular, phosphites and epoxy compounds have been recognized by many health authorities as suitable for use in plastics in contact with foodstuffs and therefore stabilizer compositions of the present invention should prove acceptable for non-toxic applications. Preferred stabilizer compositions of the present invention comprise phloroglucinol, or a mono- and/or dialkyl-ether thereof and an organic phosphite triester. The present invention will be further described in the following examples. It is to be understood that these are not to be considered as limiting the scope of the invention.

The heat stability data given in the examples were obtained by mixing the components of each specific formulation on a two roll laboratory mill at 155° C. for five minutes until the mix was thoroughly homogeneous. The required samples were obtained from the resulting sheet which was taken from the roll at a thickness of 0.05 inch. The samples were heated in an air circulating oven at 185° C. and withdrawn therefrom at ten minutes intervals when they were examined visually for rate of color development, this being taken as representative of the rate of decomposition of the P.V.C. compound.

The results of the test are given in the examples in terms of the time required by the samples to develop specific colors.

EXAMPLE I

The following "rigid" P.V.C. formulation was prepared and tested in the above described manner:

| P.V.C. | 100 parts |
| --- | --- |
| tridecyl stearate (lubricant) | 1 parts |
| stabilizer composition | 2 parts |

The stabilizer composition comprises:

| component (a) | - | phloroglucinol |
| --- | --- | --- |
| component (b) | - | di-n-dodecyl pentaerythrityl diphosphite |
| component (c) | - | calcium benzoate |

| Stabilizer (Parts by weight) | | | Time (mins) to specific color | | |
| --- | --- | --- | --- | --- | --- |
| Component (a) | Component (b) | Component (c) | pale yellow | amber | black |
| 0.5 | 1.5 | — | 35 | 50 | 60 |
| 0.4 | 1.5 | 0.1 | 35 | 50 | 60 |
| 0.3 | 1.5 | 0.2 | 35 | 55 | 65 |
| 0.2 | 1.5 | 0.3 | 30 | 50 | 55 |
| 0.1 | 1.5 | 0.4 | 25 | 40 | 55 |
| — | 1.5 | 0.5 | 10 | 25 | 55 |

EXAMPLE II

A "rigid" P.V.C. formulation is prepared as in Example I but in this case some or all of the component (b), the phosphite, is replaced by component (c), the calcium benzoate.

| Stabilizer (parts by weight) | | | Time (mins) to specific color | | |
| --- | --- | --- | --- | --- | --- |
| Component (a) | Component (b) | Component (c) | pale yellow | amber | black |
| 0.5 | 1.5 | — | 35 | 50 | 60 |
| " | 1.3 | 0.2 | 40 | 50 | 60 |
| " | 0.9 | 0.6 | 45 | 55 | 60 |
| " | 0.5 | 1.0 | 40 | 50 | 60 |
| " | 0.1 | 1.4 | 30 | 45 | 55 |
| " | — | 1.5 | 25 | 40 | 55 |

The following Examples III, IV and V illustrate the use of "nonrigid P.V.C." formulations comprising

| P.V.C. | 100 parts |
| --- | --- |
| Dialkylphthalate | 47 parts |
| Epoxy plasticizer | 3 parts |
| Stabilizer composition | 2 parts |

EXAMPLE III

This examples illustrates the use of a stabilizer composed as follows:

| compound (a) | - | phloroglucinol |
| --- | --- | --- |
| compound (b) | - | diphenyl isodecyl phosphite |

RESULTS:

| Stabilizer (Parts by weight) | | Time(mins) to specific color | | |
| --- | --- | --- | --- | --- |
| Phloroglucinol | Diphenyl iso-decyl phosphite | pale yellow | amber | black |
| 2.0 | — | 20 | 50 | 80 |
| 1.5 | 0.5 | 40 | 90 | 100 |
| 1.0 | 1.0 | 60 | 100 | 110 |
| 0.5 | 1.5 | 70 | 100 | 110 |
| — | 2.0 | 50 | 80 | 100 |

A comparison between the results in this Table and those mentioned in the Examples I and II show that the rate of color development in a flexible formulation is slower than in a rigid one. This may be explained by the fact that in a flexible P.V.C. formulation unstable P.V.C. has in effect been diluted with more thermally stable plasticizer.

It can be seen from the Table that the optimum ratio phloroglucinol: phosphite in the stabilizer composition is approximately 1:3 by weight.

-continued

| Test | Stabilizer (parts by wt.) Compound (a) in all cases is phloroglucinol | Compound (b) | | Time (mins) to specific color pale yellow | amber | black |
|---|---|---|---|---|---|---|
| 2 | 1.5 | & Di isodecyl phenyl phosphite | 0.5 | 50 | 90 | 100 |
|  | 1.0 | '' | 1.0 | 70 | 100 | 110 |
|  | 0.5 | '' | 1.5 | 70 | 100 | 110 |
|  | — | '' | 2.0 | 40 | 80 | 90 |
| 3 | 1.5 | & Tri isodecyl phosphite | 0.5 | 40 | 90 | 110 |
|  | 1.0 | '' | 1.0 | 60 | 100 | 110 |
|  | 0.5 | '' | 1.5 | 70 | 100 | 110 |
|  | — | '' | 2.0 | 30 | 80 | 90 |
| 4 | 1.5 | & Di cyclohexyl 2,4-di t-butyl-phenyl phosphite | 0.5 | 50 | 80 | 90 |
|  | 1.0 | '' | 1.0 | 60 | 90 | 100 |
|  | 0.5 | '' | 1.5 | 70 | 90 | 110 |
|  | — | '' | 2.0 | 30 | 80 | 90 |
| 5 | 1.5 | & Tris(p-nonyl-phenyl)phosphite | 0.5 | 50 | 90 | 100 |
|  | 1.0 | '' | 1.0 | 60 | 90 | 110 |
|  | 0.5 | '' | 1.5 | 70 | 100 | 110 |
|  | — | '' | 2.0 | 30 | 70 | 80 |
| 6 | 1.5 | & Tetra n-dodecyl Bisphenol A di-phosphite | 0.5 | 60 | 90 | 100 |
|  | 1.0 | '' | 1.0 | 70 | 100 | 110 |
|  | 0.5 | '' | 1.5 | 70 | 100 | 110 |
|  | — | '' | 2.0 | 30 | 90 | 100 |

Although the invention is described in detail for the purpose of illustration it is to be understood that such detail is solely for that purpose and that variations can be made therein by those skilled in the art without departing from the spirit and scope of the invention except as it may be limited by the claims.

What is claimed is:

1. A low toxicity stabilizer composition adapted to counteract the deteriorative effect of heat on vinyl chloride based polymers comprising a synergistic mixture of: a first stabilizer (a) having the formula:

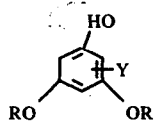

where Y is hydrogen atom or an acyl group selected from the group consisting of benzoyl and alkane carbonyl containing 2 to 18 carbon atoms, and R is selected from the group consisting of hydrogen and the following organic radicals having from one to eighteen carbon atoms: an alkyl group, a cyclohexyl group, or an aralkyl group; a second stabilizer (b) which is an organophosphite which is defined by one of the following formulae:

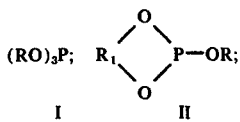

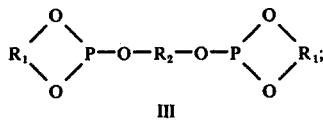

-continued

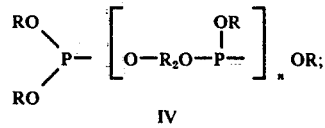

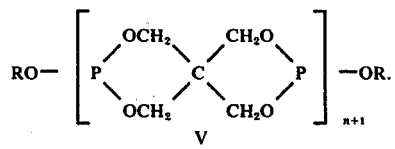

2. The stabilizer composition of claim 1 which further contains a stabilizer capable of reacting with hydrogen chloride and selected from the group of epoxy compounds, metallic soaps or organotin compounds.

3. The stabilizer composition of claim 1 in which compound (a) is phloroglucinol or a mono- or dialkyl ether thereof.

4. The stabilizer composition of claim 1 in which the weight ratio between the compounds (a) and (b) is chosen between 5:1 and 1:10.

5. The stabilizer composition of claim 4 in which the weight ratio between the compounds (a) and (b) is approximately 1:3.

6. A stabilized composition of a vinyl chloride based polymer and the stabilizer composition of claim 1, the stabilizer composition being present in an amount of 0.01 to 10 percent by weight of the total polymer formulation.

7. Shaped articles comprising the stabilized composition of polyvinyl chloride or a copolymer thereof of claim 6.

8. The stabilized composition of claim 6 wherein the amount of stabilizer composition is 1 to 5 percent by weight of the total polymer formulation.

* * * * *